United States Patent
Nagraj Rao et al.

(10) Patent No.: US 11,247,673 B2
(45) Date of Patent: Feb. 15, 2022

(54) VEHICLE OCCUPANCY INDICATION AND UTILIZATION THEREOF

(71) Applicant: Ford Global Technologies, LLC., Dearborn, MI (US)

(72) Inventors: Nikhil Nagraj Rao, Union City, CA (US); Scott Vincent Myers, Camarillo, CA (US); Lisa Scaria, Milpitas, CA (US); Harpreetsingh Banvait, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 274 days.

(21) Appl. No.: 16/506,707

(22) Filed: Jul. 9, 2019

(65) Prior Publication Data

US 2019/0329767 A1    Oct. 31, 2019

Related U.S. Application Data

(63) Continuation of application No. 15/411,439, filed on Jan. 20, 2017, now Pat. No. 10,392,011.

(51) Int. Cl.
| | |
|---|---|
| *B60W 30/09* | (2012.01) |
| *G08G 1/16* | (2006.01) |
| *G08G 1/0967* | (2006.01) |
| *B60W 50/14* | (2020.01) |
| *B60W 30/095* | (2012.01) |
| *G05D 1/00* | (2006.01) |
| *B60Q 1/50* | (2006.01) |
| *B60Q 1/32* | (2006.01) |

(52) U.S. Cl.
CPC ........ *B60W 30/09* (2013.01); *B60W 30/0956* (2013.01); *B60W 50/14* (2013.01); *G08G 1/09675* (2013.01); *G08G 1/096716* (2013.01); *G08G 1/096741* (2013.01); *G08G 1/096791* (2013.01); *G08G 1/161* (2013.01); *B60Q 1/323* (2013.01); *B60Q 1/50* (2013.01); *B60Q 1/503* (2013.01); *B60W 2050/146* (2013.01); *B60W 2530/00* (2013.01); *B60W 2555/00* (2020.02); *B60W 2556/45* (2020.02); *B60W 2556/65* (2020.02); *G05D 1/0088* (2013.01)

(58) Field of Classification Search
None
See application file for complete search history.

(56) References Cited

U.S. PATENT DOCUMENTS

| 6,037,860 A | 3/2000 | Zander | |
|---|---|---|---|
| 6,980,101 B2 | 3/2005 | Kelley | |
| 7,375,648 B1 * | 5/2008 | Mulka | G08G 1/017 340/539.1 |

(Continued)

FOREIGN PATENT DOCUMENTS

| CN | 201629000 U | 11/2010 |
|---|---|---|
| JP | 2008203980 A | 9/2008 |

*Primary Examiner* — Todd Melton
(74) *Attorney, Agent, or Firm* — David R. Stevens; Stevens Law Group

(57) ABSTRACT

Techniques pertaining to vehicle occupancy indication and utilization thereof are described. A method may involve determining occupancy information regarding a number of occupants in a vehicle. The method may also involve indicating the occupancy information in either or both of a human-perceivable way and a machine-perceivable way.

16 Claims, 6 Drawing Sheets

(56) References Cited

U.S. PATENT DOCUMENTS

| | | |
|---|---|---|
| 8,855,900 B2 | 10/2014 | Lection |
| 9,547,085 B2 * | 1/2017 | Bell ........................ G01S 17/42 |
| 9,804,599 B2 * | 10/2017 | Kentley-Klay ...... G05D 1/0088 |
| 10,102,685 B2 * | 10/2018 | Nyalamadugu ......... B60N 2/002 |
| 10,309,789 B2 * | 6/2019 | Ramasamy ...... G08G 1/096775 |
| 10,363,866 B2 * | 7/2019 | Kline ..................... B60Q 5/005 |
| 2017/0072903 A1 * | 3/2017 | Farshchi ................. B60R 22/48 |

* cited by examiner

VEHICLE OCCUPANCY INDICATION AND UTILIZATION THEREOF

CROSS REFERENCE TO RELATED PATENT APPLICATION(S)

The present disclosure is part of a continuation application of U.S. patent application Ser. No. 15/411,439, filed on Jan. 20, 2017, the content of which is incorporated by reference in its entirety.

TECHNICAL FIELD

The present disclosure generally relates to vehicles and, more particularly, to vehicle occupancy indication and utilization of such information.

BACKGROUND

With fast-paced development of autonomous vehicles, it is foreseeable that there eventually may be unoccupied vehicles, in addition to vehicles occupied by human occupants, traveling on the roads at any given point in time. Certain tasks, such as traffic control and decision-making for minimization of damage during a collision, may benefit both autonomous vehicles and manually-driven vehicles if the occupancy of vehicles traveling on the roads can be known publicly.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
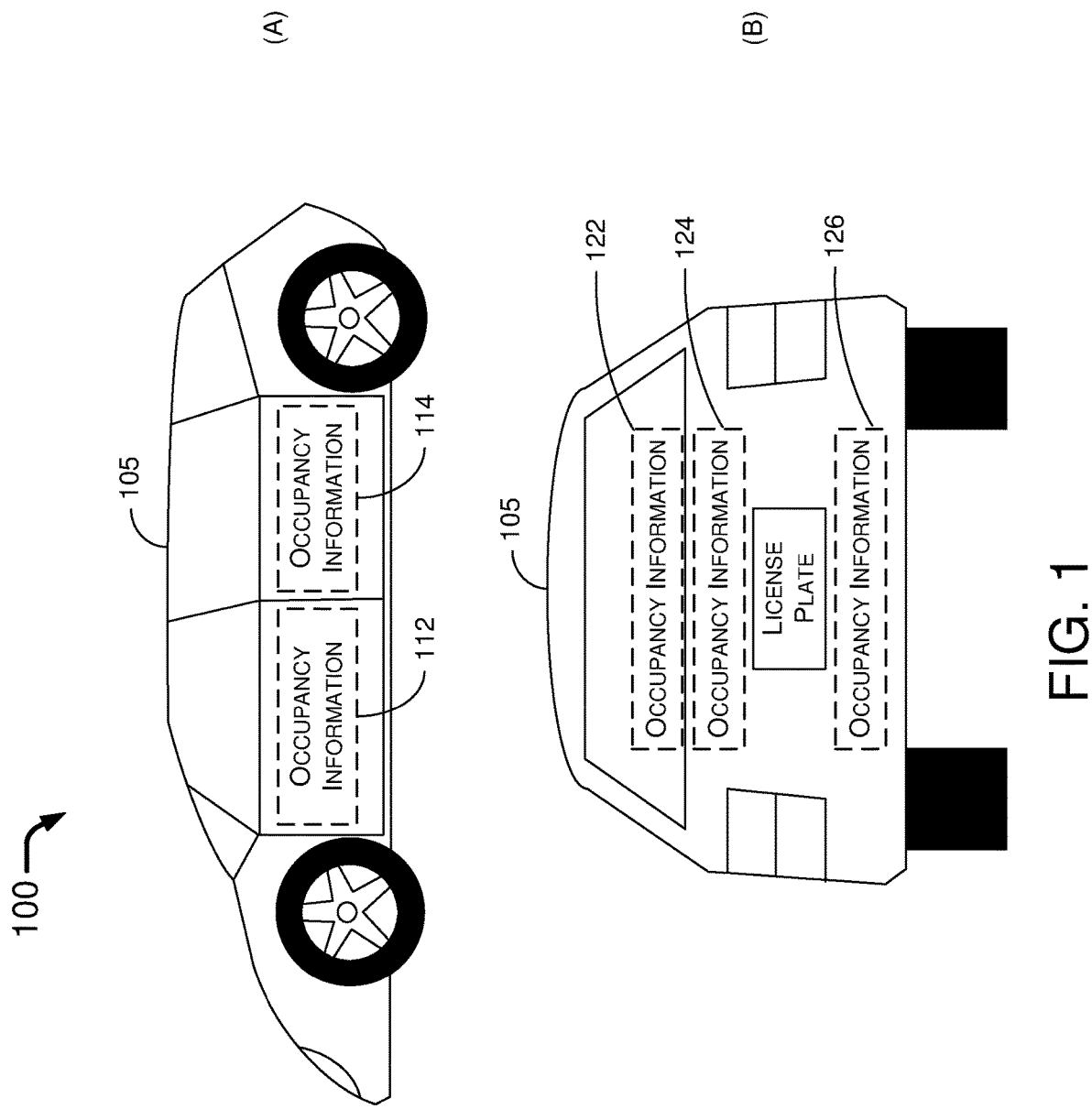
FIG. 1 is a diagram depicting an example scenario in which embodiments in accordance with the present disclosure may be utilized.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The present disclosure provides a number of innovative aspects with respect to vehicle occupancy indication and utilization thereof with respect to human-perceivable indication, vehicle-to-vehicle (V2V) communication, as well as vehicle-to-infrastructure and/or vehicle-to-anything (V2X) communication. The human-perceivable indication may be implemented in the form of one or more visual indicators to indicate to drivers of other vehicles the occupancy information of a vehicle (e.g., whether the vehicle is occupied and/or the number of occupants in the vehicle (or level of occupancy)). In some implementations in accordance with the present disclosure, the one or more visual indicators may include one or more light bars and/or one or more numerical displays placed on the body of the vehicle.

The occupancy information of a vehicle may be communicated to one or more other vehicles by the vehicle transmitting its occupancy information to nearby vehicle(s) in a traffic via any suitable V2V communication protocol, specification and/or standard. For instance, a vehicle may transmit to nearby vehicle(s) a broadcast message or a message based on the prevailing situation. The transmitting vehicle may utilize suitable protocols and/or algorithms to decide the timing and frequency of transmission of such a message. Upon receiving such a message, each of the nearby vehicle(s) may plan a respective maneuver pattern based on the occupancy information contained in the message. In some cases, such as emergency situations, the occupancy information may be invaluable when any of the nearby vehicle(s) is involved in an unavoidable crash as the occupancy information may be utilized by the crashing vehicle in determining where to crash into in order to minimize the injury and/or damage caused by the crash. For instance, instead of crashing into a vehicle with a large number of occupants, a crashing vehicle that is to unavoidably crash into another vehicle may decide to crash into an unoccupied autonomous vehicle by appropriate maneuvers so as to avoid causing injury and/or fatality of occupant(s) of the high-occupancy vehicle.

There may be situations in which a particular set of vehicles in a traffic may have the same number of occupants (e.g., one human driver), and the crashing vehicle may not necessarily have a preference in deciding which vehicle of the particular set of vehicles to crash into when a crash is unavoidable. In such cases the crashing vehicle may utilize one or more other factors and/or arbitration mechanism in decision-making to maximize the holistic safety and to minimize injury and/or damage.

There may also be situations in which an autonomous vehicle is occupied by a pet or a baby, and such information may also be included as part of the occupancy information transmitted to other vehicles and/or infrastructure. In some implementations, a vehicle may determine a 'safety metric' (e.g., based on the level of occupancy and/or the type of occupancy) to indicate to other vehicles how important it is for the other vehicles to avoid crashing into such vehicle.

Additionally or alternatively, the occupancy information of a vehicle may be communicated to specific infrastructure(s) in the environment via any suitable V2X communication protocol, specification and/or standard to enable improved traffic management. For instance, for each road of a number of roads, an infrastructure may decide an optimal traffic flow based on the number of human occupants in vehicles on the road. In some implementations, a road with a higher total number of human occupants than that of other road(s) may be assigned a higher priority than the other road(s) in a multi-way (e.g., four-way) intersection. According to the present disclosure, the infrastructure may also take into account the 'criticality' of a route taken by a given vehicle in traffic management. For instance, an autonomous ambulance may have no occupants but still have a highest 'time criticality' compared to all other vehicles on a road and, thus, may enjoy a highest priority than the other vehicles to pass through the traffic on that road.

There may be a variety of ways to set or change the criticality of a particular vehicle. For example, a higher criticality may be assigned to carpooling vehicles. Advantageously, this may encourage carpooling and thereby decrease traffic congestion and carbon emission from vehicles. As another example, there may be a mechanism for a vehicle to request for a higher priority so that the vehicle may pass through a section of the road by paying a higher toll even though the occupancy of such vehicle is low. In some implementations, there may be specific lane(s) on a road dedicated to particular occupancy level(s) so as to optimize and prioritize traffic flow.

FIG. 1 illustrates an example scenario 100 in which embodiments in accordance with the present disclosure may be utilized. In scenario 100, a vehicle 105 in accordance with the present disclosure may be capable of determining occupancy information regarding occupancy (e.g., number of occupants) in vehicle 105 and indicating the occupancy information in a human-perceivable way. The occupancy information may include one or more types of information including, for example and without limitation, whether the vehicle is occupied, the number of occupants in the vehicle (or, level of occupancy), and/or the type of occupant(s) in the vehicle.

In indicating the occupancy information in a human-perceivable way, vehicle 105 may be equipped or otherwise configured to indicate the occupancy information via one or more visual indicators to visibly indicate the occupancy information. Specifically, vehicle 105 may be capable of displaying the occupancy information at one or more locations thereon. Referring to part (A) of FIG. 1, which shows a side of vehicle 105, vehicle 105 may be capable of indicating the occupancy information on one or more doors thereof. In the example shown in part (A) of FIG. 1, vehicle 105 may have either or both of visual indicator 112 and a visual indicator 114, each capable of providing an indication pertaining to the occupancy in vehicle 105. Referring to part (B) of FIG. 1, which shows rear end of vehicle 105, vehicle 105 may be capable of indicating the occupancy information on one or more portions of the rear end such as, for example and without limitation, rear bumper, trunk hood, car body and/or rear windshield. In the example shown in part (B) of FIG. 1, vehicle 105 may have one or more of visual indicator 122, visual indicator 124 and visual indicator 126, each capable of providing an indication pertaining to the occupancy in vehicle 105.

Each of visual indicators 112, 114, 122, 124 and 126 may respectively be a light bar or a numerical display. In cases in which one or more of the visual indicators 112, 114, 122, 124 and 126 is/are implemented as a light bar, various aspects of light emitted by the visual indicator may represent various aspects of the occupancy information. For example, the amount of the light bar emitting light may represent the level of occupancy (e.g., the greater the amount of the light bar emitting the light the higher the level of occupancy, and vice versa). As another example, the color of the light emitted by the light bar may represent the type of occupancy, with white color indicating a normal status (e.g., autonomous vehicles with no occupancy and vehicles having no privilege), yellow color indicating a special status (e.g., high-occupancy vehicles, vehicles carrying a baby, vehicles having paid a toll), and red color indicating a critical status (e.g., ambulance or emergency vehicles).

Similarly, in cases in which one or more of the visual indicators 112, 114, 122, 124 and 126 is/are implemented as a numerical display, various aspects of content displayed by the visual indicator may represent various aspects of the occupancy information. For example, the digit displayed by the numerical display may represent the level of occupancy (e.g., "3" indicating three occupants, "0" indicating no occupant, "1" indicating one occupant, and so on). As another example, the color of the light emitted by the numerical display may represent the type of occupancy, with white color indicating a normal status (e.g., autonomous vehicles with no occupancy and vehicles having no privilege), yellow color indicating a special status (e.g., high-occupancy vehicles, vehicles carrying a baby, vehicles having paid a toll), and red color indicating a critical status (e.g., ambulance or emergency vehicles).

Figure 2:
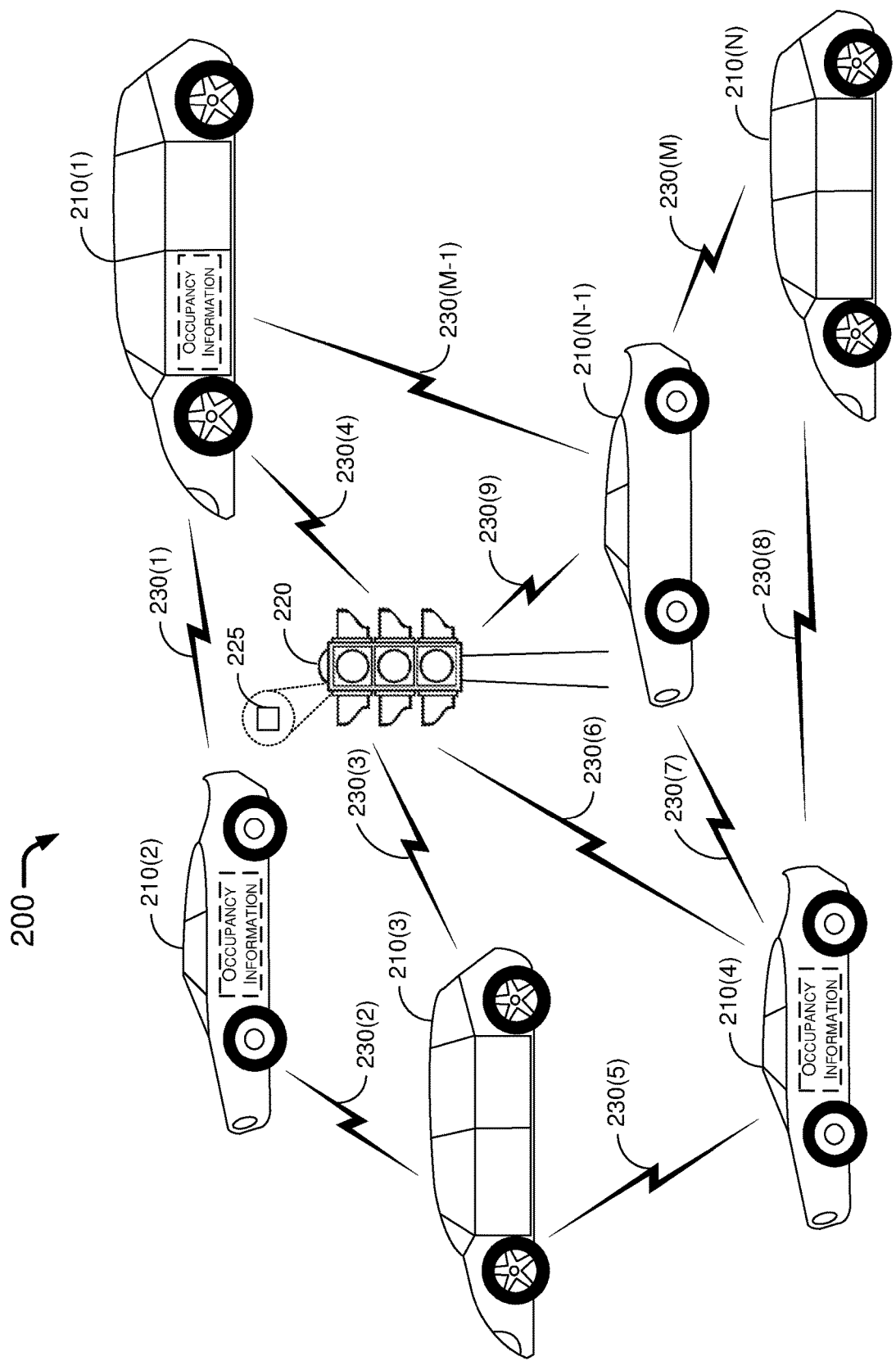
FIG. 2 is a diagram depicting an example scenario in which embodiments in accordance with the present disclosure may be utilized.

FIG. 2 illustrates an example scenario 200 in which embodiments in accordance with the present disclosure may be utilized. In scenario 200, each of a number of vehicles in accordance with the present disclosure, such as vehicles 210(1)-210(N), may be capable of determining occupancy information regarding occupancy (e.g., number of occupants) in the respective vehicle and indicating the occupancy information in either or both of a human-perceivable way and a machine-perceivable way. The occupancy information may include one or more types of information including, for example and without limitation, vehicle identification (e.g., the vehicle identification number (VIN) and/or pertinent description of the vehicle), whether the vehicle is occupied, the number of occupants in the vehicle (or, level of occupancy), and/or the type of occupant(s) in the vehicle.

Referring to FIG. 2, vehicles 210(1)-210(N) may be vehicles in a traffic on one or more roads near an infrastructure such as a traffic control device 220. Traffic control device 220 may be equipped with a processor 225 which controls at least operations of traffic control device 220 with respect to various embodiments in accordance with the present disclosure. Moreover, one or more of vehicles 210(1)-210(N) may be autonomous vehicles, which may or may not be occupied by any occupant at any given time. Some of vehicles 210(1)-210(N), such as vehicles 210(1), 210(2) and 210(4), may be capable of determining and indicating the respective occupancy information in a human-perceivable way, similar to vehicle 105. Accordingly, features and description above with respect to vehicle 105 are applicable to each of vehicles 210(1), 210(2) and 210(4), and will not be repeated to avoid redundancy. In addition, each of vehicles 210(1)-210(N) may be capable of determining and indicating the respective occupancy information in a machine-perceivable way. For instance, each of vehicles 210(1)-210(N) may be capable of wirelessly transmitting the respective occupancy information via a V2V communication protocol, a V2X communication protocol, or both. That is, each of vehicles 210(1)-210(N) may be capable of wireless communication with one or more other vehicles of vehicles 210(1)-210(N) via a V2V communication protocol and/or wireless-capable infrastructure (e.g., traffic control device 220) via a V2X communication protocol.

In the example shown in FIG. 2, vehicle 210(1) may be capable of transmitting its occupancy information to its nearby vehicles, such as vehicles 210(2) and 210(N−1), via wireless communications 230(1) and 230(M−1), respectively, as well as to traffic control device 220 via wireless communication 230(4). Vehicle 210(2) may be capable of transmitting its occupancy information to its nearby vehicles, such as vehicles 210(1) and 210(3), via wireless communications 230(1) and 230(2), respectively. Vehicle 210(3) may be capable of transmitting its occupancy information to its nearby vehicles, such as vehicles 210(2) and 210(4), via wireless communications 230(2) and 230(5), respectively, as well as to traffic control device 220 via wireless communication 230(3). Vehicle 210(4) may be capable of transmitting its occupancy information to its nearby vehicles, such as vehicles 210(3), 210(N−1) and 210(N), via wireless communications 230(5), 230(7) and 230(8), respectively, as well as to traffic control device 220 via wireless communication 230(6). Vehicle 210(N−1) may be capable of transmitting its occupancy information to its nearby vehicles, such as vehicles 210(1), 210(4) and 210(N), via wireless communications 230(M−1), 230(7) and 230 (M), respectively, as well as to traffic control device 220 via wireless communication 230(9). Vehicle 210(N) may be capable of transmitting its occupancy information to its nearby vehicles, such as vehicles 210(4) and 210(N−1), via wireless communications 230(8) and 230(M), respectively.

In some embodiments, in wirelessly transmitting its occupancy information, each of vehicles 210(1)-210(N) may be capable of broadcasting its occupancy information. Accordingly, vehicles capable of wireless communication via a V2V communication protocol and in the vicinity of one of vehicles 210(1)-210(N) (e.g., within the range of wireless communication) may receive the wirelessly transmitted occupancy information.

In some embodiments, upon receiving the occupancy information of a nearby vehicle, a vehicle may wirelessly transmit (e.g., broadcast) the received occupancy information to other nearby vehicle(s) and/or wireless-capable infrastructure. For illustrative purposes and without limitation, upon receiving the occupancy information of vehicle 210 (N), vehicle 210(N−1) may wirelessly transmit the occupancy information of vehicle 210(N) along with the occupancy information of vehicle 210(N−1). Accordingly, even though vehicle 210(1) may not be in direct wireless communication with vehicle 210(N) (e.g., being out of range for wireless communication via the V2V communication protocol), vehicle 210(1) may still be aware of the occupancy information of vehicle 210(N) due to information received from vehicle 210(N−1).

In some embodiments, upon receiving the occupancy information of a nearby vehicle, a wireless-capable infrastructure may wirelessly transmit (e.g., broadcast) the received occupancy information to other nearby vehicle(s) and/or wireless-capable infrastructure. For illustrative purposes and without limitation, upon receiving the occupancy information of vehicle 210(4), traffic control device 220 may wirelessly transmit the occupancy information of vehicle 210(4) along with the occupancy information of one or more other vehicles. Accordingly, even though vehicle 210(1) may not be in direct wireless communication with vehicle 210(4) (e.g., being out of range for wireless communication via the V2V communication protocol), vehicle 210(1) may still be aware of the occupancy information of vehicle 210(4) due to information received from traffic control device 220.

Accordingly, each of vehicles 210(1)-210(N) may obtain (e.g., wirelessly receiving from another vehicle and/or traffic control device 220) additional occupancy information from one or more other vehicles of vehicles 210(1)-210(N), and thus may be aware of a number of occupants in each of the one or more other vehicles of vehicles 210(1)-210(N). Moreover, each of vehicles 210(1)-210(N) may determine, based at least in part on its own occupancy and the additional occupancy information regarding the one or more other vehicles, a maneuvering pattern to maneuver itself when the vehicle is in a predefined condition such as, for example and without limitation, that the vehicle being involved in an unavoidable collision with at least another vehicle of vehicles 210(1)-210(N). In some embodiments, the maneuvering pattern may include a pattern that maneuvers the vehicle to crash into one of vehicles 210(1)-210(N) with a number of occupants lower than that of the at least another vehicle. Additionally, each of vehicles 210(1)-210(N) may determine whether the vehicle is in the predefined condition and, in response to a determination that itself is in the predefined condition, the vehicle may maneuver itself using the maneuvering pattern.

As an example, assuming vehicle 210(N) determines that it will likely and unavoidably collide with either vehicle 210(N−1) or vehicle 210(4), vehicle 210(N) may maneuver itself to crash into vehicle 210(N−1) instead of vehicle 210(4) when the occupancy information obtained by vehicle 210(N) indicates that there are more occupants in vehicle 210(4) than in vehicle 210(N−1). As another example, assuming vehicle 210(N) determines that it will likely and unavoidably collide with either vehicle 210(N−1) or vehicle 210(4), vehicle 210(N) may maneuver itself to crash into vehicle 210(4) instead of vehicle 210(N−1) when the occupancy information obtained by vehicle 210(N) indicates that there is a special type of occupant (e.g., baby) in vehicle 210(N−1) regardless of the number of occupants in vehicle 210(4). For instance, vehicle 210(N−1) may be carrying two human occupants (e.g., a mother and her baby) with one of the occupants having a special status (e.g., being a baby), and vehicle 210(4) may be carrying three human occupants (e.g., three adults) with none of the occupants having any special status. The special status of a given occupant of a vehicle, whether a human passenger or a pet, may be included in the occupancy information that is wirelessly transmitted by the vehicle.

Figure 3:
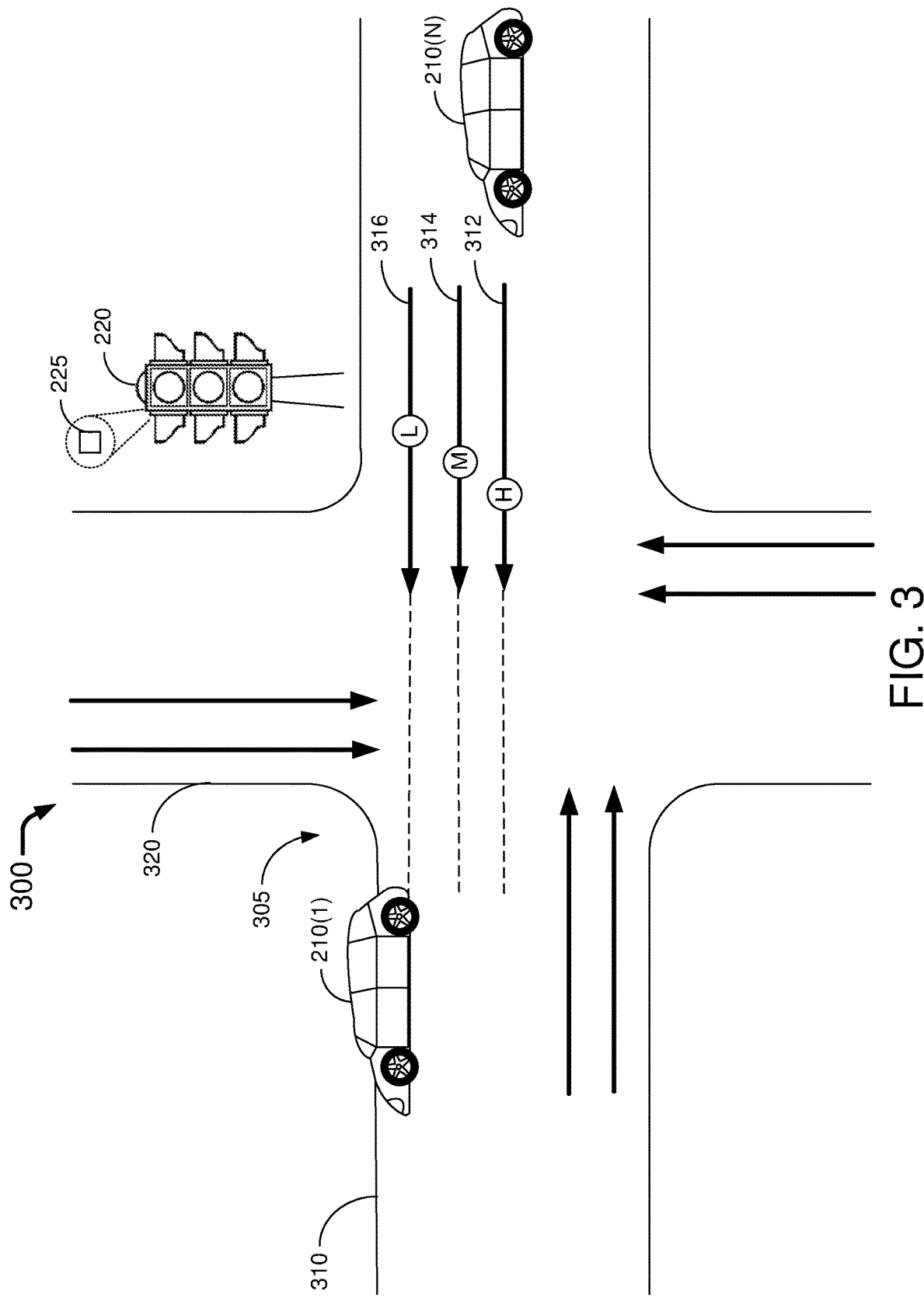
FIG. 3 is a diagram depicting an example scenario in which embodiments in accordance with the present disclosure may be utilized.

FIG. 3 illustrates an example scenario 300 in which embodiments in accordance with the present disclosure may be utilized. In scenario 300, traffic control device 220 may perform various operations pertaining to the utilization of occupancy information received from a number of vehicles such as vehicles 210(1)-210(N). For instance, processor 225 of traffic control device 220 may receive, via one or more V2X communication protocols, occupancy information regarding a number of occupants in each of vehicles 210 (1)-210(N). Processor 225 of traffic control device 220 may manage one or more traffic flows based at least in part on the occupancy information. That is, processor 225 of traffic control device 220 may decide one or more optimal traffic flows based on the number of human occupants in vehicles 210(1)-210(N).

In some embodiments, a road with a higher total number of human occupants than that of other road(s) may be assigned a higher priority than the other road(s) in a multi-way (e.g., four-way) intersection, such as intersection 305 between a road 310 and a road 320 in FIG. 3. For instance, in managing the traffic flow(s), processor 225 of traffic control device 220 may rank vehicles 210(1)-210(N) based at least in part on the occupancy information. Additionally, processor 225 of traffic control device 220 may direct one or more vehicles of vehicles 210(1)-210(N) to travel on one or more lanes of at least one of road 310 and road 320 according to a result of the ranking.

As an example, a level of occupancy (e.g., number of occupants) of vehicle 210(N) may be higher than a level of occupancy of vehicle 210(1) and, as a result of the ranking, vehicle 210(N) may be designated to a higher criticality while vehicle 210(1) may be designated to a lower criticality by processor 225 of traffic control device 220 due to vehicle 210(N) having a higher level of occupancy than that of vehicle 210(1). Processor 225 may designate a first lane (e.g., lane 312) of road 310 for use by vehicles associated with the higher criticality, a second lane (e.g., lane 316) of road 310 for use by vehicles associated with the lower criticality, and a third lane (e.g., lane 314) of road 310 for use by vehicles associated with a medium criticality. Accordingly, in this example, processor 225 of traffic control device 220 may direct vehicle 210(N) to travel on lane 312 (since vehicle 210(N) is designed to the higher criticality) and vehicle 210(1) to travel on lane 316 (since vehicle 210(1) is designated to the lower criticality).

As another example, a level of occupancy (e.g., number of occupants) of vehicle 210(N) may be lower than a level of occupancy of vehicle 210(1) and, as a result of the ranking, vehicle 210(N) may be designated to a higher criticality while vehicle 210(1) may be designated to a lower criticality by processor 225 of traffic control device 220 due to vehicle 210(N) being associated with a special status (e.g., being an ambulance vehicle, having a baby onboard, or having paid a toll to obtain the special status) despite vehicle 210(N) having lower occupancy than vehicle 210(1). Processor 225 may designate a first lane (e.g., lane 312) of road 310 for use by vehicles associated with the higher criticality, a second lane (e.g., lane 316) of road 310 for use by vehicles associated with the lower criticality, and a third lane (e.g., lane 314) of road 310 for use by vehicles associated with a medium criticality. Accordingly, in this example, processor 225 of traffic control device 220 may direct vehicle 210(N) to travel on lane 312 (since vehicle 210(N) is designed to the higher criticality) and vehicle 210(1) to travel on lane 316 (since vehicle 210(1) is designated to the lower criticality).

In view of the above, processor 225 of traffic control device 210 may also take into account the 'criticality' of a route taken by a given vehicle in traffic management. For example, an autonomous ambulance may have no occupants but still have a highest 'time criticality' compared to all other vehicles on a road and, thus, may enjoy a highest priority than the other vehicles to pass through the traffic on that road. As another example, having paid a toll to gain a special status, vehicle 210(N) may have a higher 'criticality' than other vehicles, such as vehicle 210(1), even though vehicle 210(N) may have a lower level of occupancy than vehicle 210(1). In some embodiments, processor 225 of traffic control device 210 may assign higher criticality to vehicles with high occupancy so as to encourage carpooling. In some embodiments, processor 225 of traffic control device 210 may designate specific lane(s) on a road to particular occupancy level(s) so as to optimize and prioritize traffic flow on such road.

Figure 4:
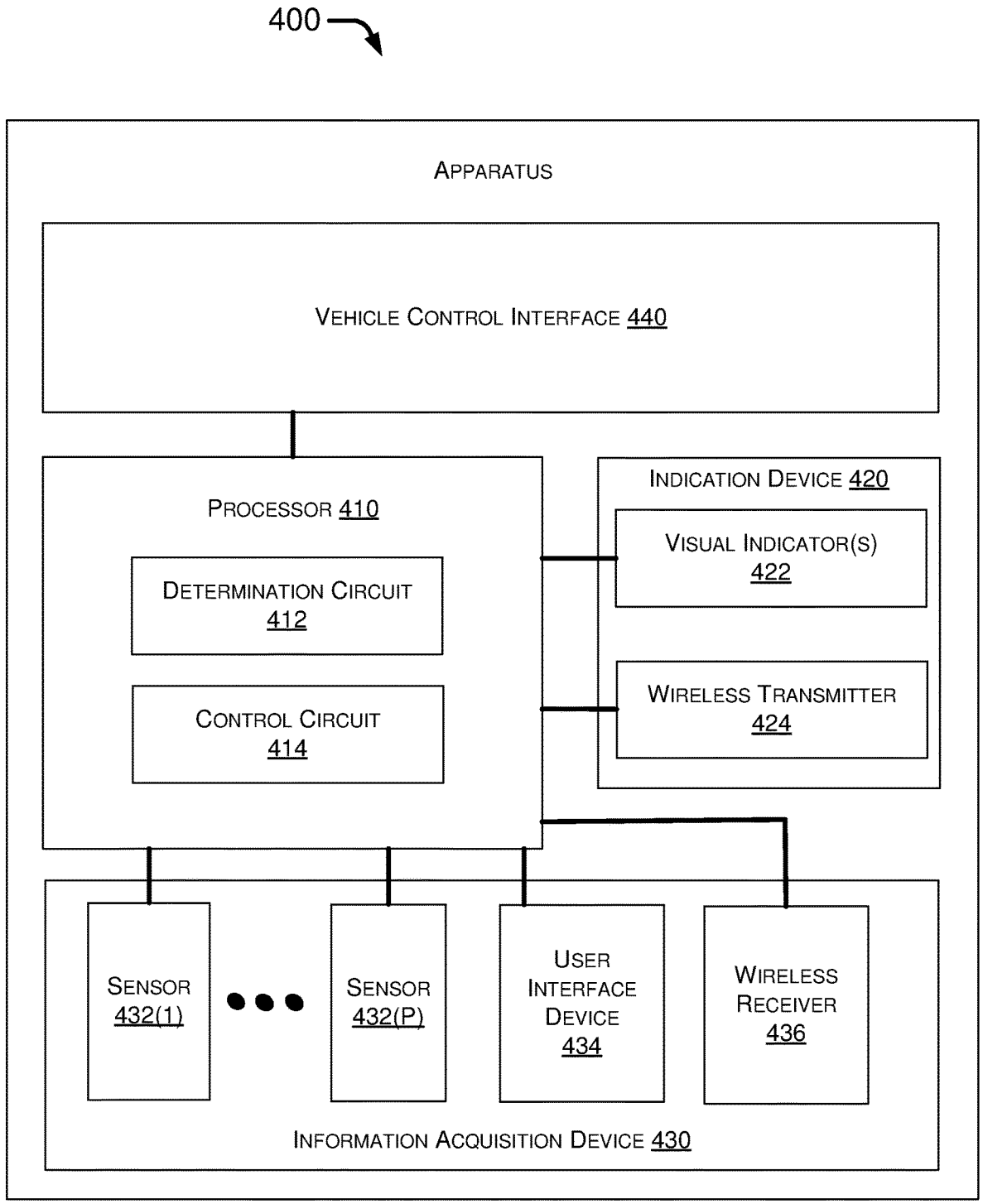
FIG. 4 is a diagram depicting an example apparatus implementable in a vehicle in accordance with the present disclosure.

FIG. 4 illustrates an example apparatus 400 in accordance with the present disclosure. Apparatus 400 may perform various functions related to techniques, features, functions, operations and processes described herein, including those described above with respect to scenario 100, scenario 200 and scenario 300 as well as those described below with respect to process 500 and process 600. Apparatus 400 may be installed in, equipped on, connected to or otherwise implemented in vehicle 105 in scenario 100 and each of vehicles 210(1)-210(N) in scenario 200 and scenario 300 to effect various embodiments in accordance with the present disclosure. Apparatus 400 may include one, some or all of the components shown in FIG. 4. Apparatus 400 may also include one or more other components not be pertinent to various embodiments of the present disclosure and, thus, such component(s) is/are not shown in FIG. 4 and a description thereof is not provided herein in the interest of brevity.

Apparatus 400 may include at least a processor 410, which may include a determination circuit 412 and a control circuit 414. Processor 410 may be implemented in the form of one or more single-core processors, one or more multi-core processors, or one or more CISC processors. Thus, even though a singular term "a processor" is used herein to refer to processor 410, processor 410 may include multiple processors in some embodiments and a single processor in other embodiments in accordance with the present disclosure. In another aspect, processor 410 may be implemented in the form of hardware (and, optionally, firmware) with electronic components including, for example and without limitation, one or more transistors, one or more diodes, one or more capacitors, one or more resistors and/or one or more inductors that are configured and arranged to achieve specific purposes in accordance with the present disclosure. In other words, in at least some embodiments, processor 410 is a special-purpose machine specifically designed, arranged and configured to perform specific tasks including vehicle occupancy indication and utilization thereof in accordance with various embodiments of the present disclosure.

Apparatus 400 may also include an information acquisition device 430 capable of obtaining data indicative of a number of occupants in the vehicle in which apparatus 400 is installed, equipped or otherwise implemented. Information acquisition device 430 may include, for example and without limitation, one or more sensors 432(1)-432(P) and/or a user interface device 434. Each of one or more sensors 432(1)-432(P) may be capable of sensing, detecting or otherwise measuring a respective parameter related to a presence of an occupant (e.g., a human being or a pet). As an example, sensor 432(1) may include a pressure sensor mounted under a seat of the vehicle and may detect a presence of an occupant as a result of detecting a pressure or force exerted on the seat. As another example, sensor 432(1) may include a camera capable of providing processor 410 with imagery data of an interior of the vehicle and, based on the imagery data and employment of an image recognition program, processor 410 may determine the level of occupancy (e.g., number of occupants) in the vehicle. User interface device 434 may allow a user to enter occupancy information. User interface device 434 may be optionally capable of providing information to the user visually and/or audibly. User interface device 434 may include, for example and without limitation, a display panel, a touch-sensing panel, a keyboard, a key pad, one or more buttons and/or one or more dials.

Apparatus 400 may also include an indication device 420, which may include one or more visual indicators 422 and/or a wireless transmitter 424. Each of the one or more visual indicators 422 may be an example implementation of any of visual indicator 112, 114, 122, 124 or 126. That is, features and description above with respect to visual indicators 112, 114, 122, 124 and 126 are applicable to each of one or more visual indicators 422, and will not be repeated to avoid redundancy. Wireless transmitter 424 may be capable of wireless communication at least in accordance with one or more V2V communication protocols, one or more V2X communication protocols, or a combination thereof.

Processor 410 may be operatively coupled to information acquisition device 430 and indication device 420, and may be capable of performing operations pertaining to vehicle occupancy indication and utilization thereof in accordance with various embodiments of the present disclosure. For instance, determination circuit 412 of processor 410 may determine, using the data obtained by information acquisition device 430, occupancy information regarding the number of occupants in the vehicle in which apparatus 400 is installed, equipped or otherwise implemented. Additionally, control circuit 414 of processor 400 may control indication device 420 to indicate the occupancy information in either or both of a human-perceivable way and a machine-perceivable way.

In some embodiments, in indicating the occupancy information in the human-perceivable way, processor 410 may be capable of controlling the one or more visual indicators 422 of indication device 420 to visibly indicate the occupancy information. In some embodiments, the one or more visual indicators 422 may include one or more light bars, one or more numerical displays, or a combination thereof.

In some embodiments, in indicating the occupancy information in the machine-perceivable way, processor 410 may be capable of controlling wireless transmitter 424 of indication device 420 to wirelessly transmit the occupancy information via a V2V communication protocol, a V2X communication protocol, or both.

In some embodiments, information acquisition device 430 may also include a wireless receiver 436 capable of wirelessly receiving data via one or more V2V communication protocols, one or more V2X communication protocols, or a combination thereof. In such cases, processor 410 may also be capable of obtaining, via wireless receiver 436 of information acquisition device 430, additional occupancy information from each of one or more other vehicles regarding a number of occupants in the respective vehicle. Moreover, determination circuit 412 of processor 410 may be capable of determining, based at least in part on the occupancy information regarding the vehicle and the additional occupancy information regarding the one or more other vehicles, a maneuvering pattern to maneuver the vehicle when the vehicle is in a predefined condition. In some embodiments, the predefined condition may be the vehicle being involved in an unavoidable collision with at least one vehicle of the one or more vehicles. In some embodiments, the maneuvering pattern may include a pattern that maneuvers the vehicle to crash into one of the one or more vehicles with a number of occupants lower than that of at least another of the one or more vehicles.

In some embodiments, apparatus 400 may include a vehicle control interface 440 coupled to processor 410 such that processor 410 may autonomously control, operate or otherwise maneuver the vehicle (e.g., vehicle 105 or any of vehicles 210(1)-210(N)) without human input, control and/or intervention. Vehicle control interface 440 may communicate with necessary mechanical, electrical, pneumatic and/or hydraulic components of the vehicle for the control and/or maneuvering of the vehicle. Thus, upon receiving signals and/or commands from processor 410, vehicle control interface 440 may actuate, activate, control and/or operate one or more parts of the vehicle (e.g., to drive and maneuver the vehicle). In some embodiments, the one or more sensors 432(1)-432(P) may be capable of detecting parameters regarding a status of the vehicle in a traffic. In such cases, determination circuit 412 of processor 410 may be capable of determining whether the vehicle is in the predefined condition based on a result of the detecting by the one or more sensors 432(1)-432(P). Moreover, control circuit 414 of processor 410 may be capable of controlling vehicle control interface 440 to maneuver the vehicle using the maneuvering pattern responsive to a determination that the vehicle is in the predefined condition.

Figure 5:
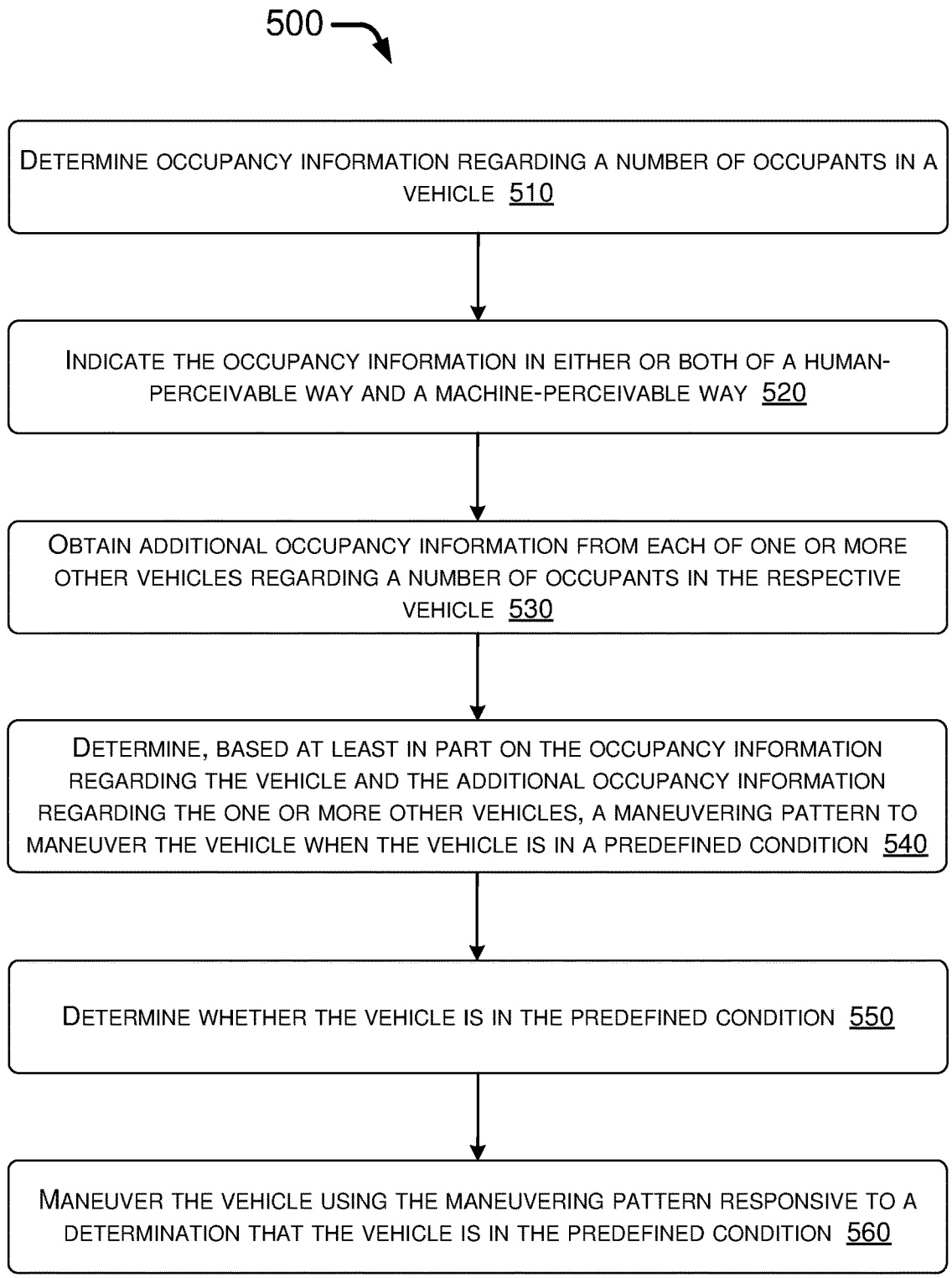
FIG. 5 is a flowchart depicting an example process in accordance with an embodiment of the present disclosure.

FIG. 5 illustrates an example process 500 in accordance with an embodiment of the present disclosure. Process 500 may include one or more operations, actions, or functions shown as blocks such as 510, 520, 530, 540, 550 and 560. Although illustrated as discrete blocks, various blocks of process 500 may be divided into additional blocks, combined into fewer blocks, or eliminated, depending on the desired implementation. Process 500 may be implemented in or by scenario 100, scenario 200, scenario 300 and/or apparatus 400. For illustrative purposes and without limitation, the following description of process 500 is provided in the context of apparatus 400 being implemented in each vehicle in scenario 100 and scenario 200. Process 500 may begin with block 510.

At 510, process 500 may involve processor 410 of apparatus 400 associated with a vehicle determining occupancy information regarding a number of occupants in the vehicle. Process 500 may proceed from 510 to 520.

At 520, process 500 may involve processor 410 indicating the occupancy information in either or both of a human-perceivable way and a machine-perceivable way. In some embodiments, in indicating the occupancy information in the human-perceivable way, process 500 may involve processor 410 controlling one or more visual indicators 422 (e.g., at least a light bar or a numerical display) of indication device 420 to visibly indicate the occupancy information. Alternatively or additionally, in indicating the occupancy information in the machine-perceivable way, process 500 may involve processor 410 wirelessly transmitting, via wireless transmitter 424 of indication device 420, the occupancy information via a V2V communication protocol, a V2X communication protocol, or both. Process 500 may proceed from 520 to 530.

At 530, process 500 may involve processor 410 obtaining additional occupancy information from each of one or more other vehicles regarding a number of occupants in the respective vehicle (e.g., via wireless receiver 436). Process 500 may proceed from 530 to 540.

At 540, process 500 may involve processor 410 determining, based at least in part on the occupancy information regarding the vehicle and the additional occupancy information regarding the one or more other vehicles, a maneuvering pattern to maneuver the vehicle when the vehicle is in a predefined condition. In some embodiments, the predefined condition may include the vehicle being involved in an unavoidable collision with at least one vehicle of the one or more vehicles. In some embodiments, the maneuvering pattern may include a pattern that maneuvers the vehicle to crash into one of the one or more vehicles with a number of occupants lower than that of at least another of the one or more vehicles. Process 500 may proceed from 540 to 550.

At 550, process 500 may involve processor 410 determining whether the vehicle is in the predefined condition. Process 500 may proceed from 550 to 560.

At 560, process 500 may involve processor 410 maneuvering, via vehicle control interface 440, the vehicle using the maneuvering pattern responsive to a determination that the vehicle is in the predefined condition.

Figure 6:
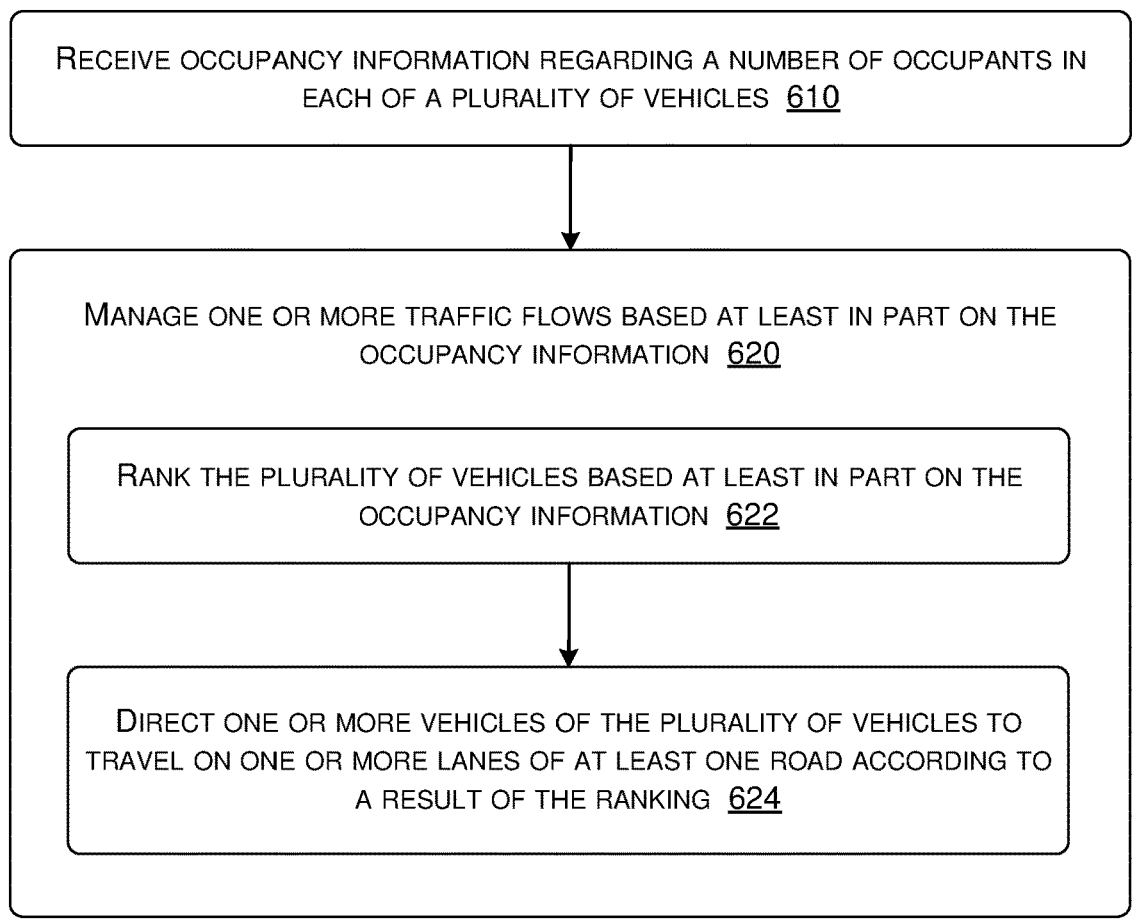
FIG. 6 is a flowchart depicting an example process in accordance with an embodiment of the present disclosure.

FIG. 6 illustrates an example process 600 in accordance with an embodiment of the present disclosure. Process 600 may include one or more operations, actions, or functions shown as blocks such as 610 and 620 as well as sub-blocks 622 and 624. Although illustrated as discrete blocks, various blocks of process 600 may be divided into additional blocks, combined into fewer blocks, or eliminated, depending on the desired implementation. Process 600 may be implemented in or by scenario 100, scenario 200, scenario 300 and/or apparatus 400. For illustrative purposes and without limitation, the following description of process 600 is provided in the context of traffic control device 220. Process 600 may begin with block 610.

At 610, process 600 may involve a processor associated with a roadside traffic control infrastructure (e.g., processor 225 of traffic control device 220) receiving occupancy information regarding a number of occupants in each of a plurality of vehicles (e.g., vehicles 210(1)-210(N)). Process 600 may proceed from 610 to 620.

At 620, process 600 may involve processor 225 managing one or more traffic flows based at least in part on the occupancy information.

In managing the traffic flow, process 600 may involve a number of operations such as those of sub-blocks 622 and 624, as described below.

At 622, process 600 may involve processor 225 ranking the plurality of vehicles based at least in part on the occupancy information. Process 600 may proceed from 622 to 624.

At 624, process 600 may involve processor 225 directing one or more vehicles of the plurality of vehicles to travel on one or more lanes of at least one road according to a result of the ranking.

In directing the one or more vehicles of the plurality of vehicles to travel on the one or more lanes of the at least one road, process 600 may involve a number of operations. For instance, process 600 may involve processor 225 designating a first lane of the one or more lanes for use by vehicles associated with a higher criticality. Additionally, process 600 may involve processor 225 designating a second lane of the one or more lanes for use by vehicles associated with a lower criticality. Moreover, process 600 may involve processor 225 directing a first vehicle of the plurality of vehicles to travel on the first lane. Furthermore, process 600 may involve processor 225 directing a second vehicle of the plurality of vehicles to travel on the second lane. A number of occupants of the first vehicle may be higher than a number of occupants of the second vehicle. The result of the ranking may designate the first vehicle to the higher criticality and the second vehicle to the lower criticality.

Alternatively, in directing the one or more vehicles of the plurality of vehicles to travel on the one or more lanes of the at least one road, process 600 may involve a number of other operations. For instance, process 600 may involve processor 225 designating a first lane of the one or more lanes for use by vehicles associated with a higher criticality. Additionally, process 600 may involve processor 225 designating a second lane of the one or more lanes for use by vehicles associated with a lower criticality. Moreover, process 600 may involve processor 225 directing a first vehicle of the plurality of vehicles to travel on the first lane. Furthermore, process 600 may involve processor 225 directing a second vehicle of the plurality of vehicles to travel on the second lane. A number of occupants of the first vehicle may be lower than a number of occupants of the second vehicle. The result of the ranking may designate the first vehicle to the higher criticality and the second vehicle to the lower criticality due to the first vehicle being associated with a special status.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

What is claimed is:

1. A method, comprising:
   determining, by a processor associated with a vehicle, occupancy information regarding a type of occupants in the vehicle; and
   indicating, by the processor, the occupancy information in either or both of a human-perceivable way and a machine-perceivable way.

2. The method of claim 1, wherein the indicating of the occupancy information in the human-perceivable way comprises controlling a visual indicator to visibly indicate the occupancy information, and wherein each type of a plurality of types of occupants is visibly displayed in a respective color of a plurality of colors.

3. The method of claim 2, wherein the controlling of the visual indicator comprises controlling at least a light bar or a numerical display.

4. The method of claim 1, wherein the indicating of the occupancy information in the machine-perceivable way comprises wirelessly transmitting the occupancy information via a vehicle-to-vehicle (V2V) communication protocol, a vehicle-to-anything (V2X) communication protocol, or both.

5. The method of claim 1, further comprising:
   obtaining, by the processor, additional occupancy information from each of one or more other vehicles regarding a number of occupants in the respective vehicle; and
   determining, by the processor based at least in part on the occupancy information regarding the vehicle and the additional occupancy information regarding the one or more other vehicles, a maneuvering pattern to maneuver the vehicle when the vehicle is in a predefined condition.

6. The method of claim 5, wherein the predefined condition comprises the vehicle being involved in an unavoidable collision with at least one vehicle of the one or more vehicles.

7. The method of claim 5, wherein the maneuvering pattern comprises a pattern that maneuvers the vehicle to crash into one of the one or more vehicles with a number of occupants lower than that of at least another of the one or more vehicles.

8. The method of claim 5, further comprising:
   determining, by the processor, whether the vehicle is in the predefined condition; and
   maneuvering, by the processor, the vehicle using the maneuvering pattern responsive to a determination that the vehicle is in the predefined condition.

9. An apparatus implementable in a vehicle, comprising:
   an information acquisition device capable of obtaining data indicative of a type of occupants in the vehicle;
   an indication device; and
   a processor operatively coupled to the information acquisition device and the indication device, the processor capable of performing operations comprising:
      determining, using the data obtained by the information acquisition device, occupancy information regarding the type of occupants in the vehicle; and
      controlling the indication device to indicate the occupancy information in either or both of a human-perceivable way and a machine-perceivable way.

10. The apparatus of claim 9, wherein the indication device comprises a visual indicator, and wherein, in indicating the occupancy information in the human-perceivable way, the processor is capable of controlling the indication device to visibly indicate the occupancy information such that each type of a plurality of types of occupants is visibly displayed in a respective color of a plurality of colors.

11. The apparatus of claim 10, wherein the visual indicator comprises at least a light bar or a numerical display.

12. The apparatus of claim 9, wherein the indication device comprises a wireless transmitter, and wherein, in indicating the occupancy information in the machine-perceivable way, the processor is capable of controlling the indication device to wirelessly transmit the occupancy information via a vehicle-to-vehicle (V2V) communication protocol, a vehicle-to-anything (V2X) communication protocol, or both.

13. The apparatus of claim 9, wherein:
the information acquisition device comprises a wireless receiver capable of wirelessly receiving data via a vehicle-to-vehicle (V2V) communication protocol,
the processor is also capable of obtaining, via the information acquisition device, additional occupancy information from each of one or more other vehicles regarding a number of occupants in the respective vehicle, and
the processor is further capable of determining, based at least in part on the occupancy information regarding the vehicle and the additional occupancy information regarding the one or more other vehicles, a maneuvering pattern to maneuver the vehicle when the vehicle is in a predefined condition.

14. The apparatus of claim 13, wherein the predefined condition comprises the vehicle being involved in an unavoidable collision with at least one vehicle of the one or more vehicles.

15. The apparatus of claim 13, wherein the maneuvering pattern comprises a pattern that maneuvers the vehicle to crash into one of the one or more vehicles with a number of occupants lower than that of at least another of the one or more vehicles.

16. The apparatus of claim 13, further comprising:
a vehicle control interface capable of operating the vehicle under the control of the processor,
wherein:
the information acquisition device comprises one or more sensors capable of detecting parameters regarding a status of the vehicle in a traffic,
the processor is also capable of determining whether the vehicle is in the predefined condition based on a result of the detecting by the one or more sensors, and
the processor is further capable of controlling the vehicle control interface to maneuver the vehicle using the maneuvering pattern responsive to a determination that the vehicle is in the predefined condition.

* * * * *